US012240351B2

(12) United States Patent
Härsjö et al.

(10) Patent No.: US 12,240,351 B2
(45) Date of Patent: Mar. 4, 2025

(54) METHOD FOR HEATING A BATTERY IN A VEHICLE AND VEHICLE

(71) Applicant: Volvo Car Corporation, Gothenburg (SE)

(72) Inventors: Joachim Härsjö, Gothenburg (SE); Markus Olsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 552 days.

(21) Appl. No.: 17/653,572

(22) Filed: Mar. 4, 2022

(65) Prior Publication Data

US 2022/0281355 A1 Sep. 8, 2022

(30) Foreign Application Priority Data

Mar. 8, 2021 (EP) ..................................... 21161309

(51) Int. Cl.
*B60L 58/27* (2019.01)
*H01M 10/44* (2006.01)
(Continued)

(52) U.S. Cl.
CPC ........... *B60L 58/27* (2019.02); *H01M 10/443* (2013.01); *H01M 10/615* (2015.04);
(Continued)

(58) Field of Classification Search
CPC .......... B60L 58/27; B60L 58/32; B60L 58/34; B60L 2240/545; B60L 2240/549;
(Continued)

(56) References Cited

U.S. PATENT DOCUMENTS

2009/0243538 A1* 10/2009 Kelty .................. H01M 10/615
320/104
2011/0144861 A1 6/2011 Lakirovich et al.
(Continued)

FOREIGN PATENT DOCUMENTS

EP 3 758 127 A1 12/2020
EP 3 758 131 A1 12/2020

OTHER PUBLICATIONS

Extended European Search Report for European Application No. 21161309.6 dated Sep. 1, 2021, 9 pages.

*Primary Examiner* — Paul Dinh
(74) *Attorney, Agent, or Firm* — Amin, Turocy & Watson, LLP

(57) ABSTRACT

A method for heating a battery in a vehicle comprises: setting, by a control unit, an alternating current (AC) storage device to a first operation mode; charging the AC storage device by transferring energy stored in the battery to the AC storage device; determining whether a charging level of the AC storage device corresponds to a defined upper threshold, setting the AC storage device to a second operation mode, when the charging level of the AC storage device is determined to correspond to the defined upper threshold, discharging the AC storage device by transferring energy stored in the AC storage device to the battery, determining whether a charging level of the AC storage device corresponds to a defined lower threshold, and setting the AC storage device to the first operation mode, when the charging level of the AC storage device is determined to correspond to the defined lower threshold.

15 Claims, 2 Drawing Sheets

(51) Int. Cl.
  *H01M 10/615*  (2014.01)
  *H01M 10/625*  (2014.01)
(52) U.S. Cl.
  CPC .... *H01M 10/625* (2015.04); *B60W 2510/246* (2013.01); *B60Y 2200/92* (2013.01)
(58) Field of Classification Search
  CPC ............ H01M 10/443; H01M 10/615; H01M 10/625; B60W 2510/246; B60Y 2200/92
  USPC ....................................................... 320/150
  See application file for complete search history.

(56) References Cited

U.S. PATENT DOCUMENTS

2013/0127398 A1    5/2013  Xu et al.
2015/0266392 A1*   9/2015  Arai ..................... B60L 58/27
                                                      320/150

\* cited by examiner

METHOD FOR HEATING A BATTERY IN A VEHICLE AND VEHICLE

TECHNICAL FIELD

The present invention relates to a method for heating a battery in a vehicle and a vehicle.

BACKGROUND ART

In general, it is known that the efficiency of a battery is dependent on its temperature. If the battery is cold, the allowed usage is limited in order to not damage or increase ageing of the battery. In case, the temperature of the battery in a vehicle is outside a preferred range, the operation of the battery outside this preferred range affects both charging and driving. Thus, before using the battery, the battery should be heated to a preferred operation temperature. In the state of the art, several systems and/or methods are known for heating a battery. For example, in (plug-in) hybrid electric vehicles ((P)HEV), the waste heat created by the internal combustion engine is used to heat the battery. For battery electric vehicles (BEV), it is known to include additional heating components, such as external heaters. External heaters produce heat outside the battery, which is then transferred into the battery, e.g. by means of a thermal cooling circuit.

SUMMARY

There may, therefore, be a need to provide an improved method for heating a battery in a vehicle and a vehicle, particularly a vehicle and/or method having an improved overall efficiency for heating a battery.

The object of the present invention is solved by the subject-matter of the appended independent claims, wherein further embodiments are incorporated in the dependent claims.

According to a first aspect, there is provided a method for heating a battery in a vehicle, particularly in a battery electric vehicle (BEV), a hybrid electric vehicle (HEV) or a plugin-hybrid electric vehicle (PHEV). Preferably, the vehicle comprises a battery, a power electronic converter, an alternating current (AC) storage device being configured to store energy for a short-term period, and a control unit, wherein the battery and the AC storage device are connected via the power electronic converter, and the control unit is configured to control the AC storage device. The method comprises the following, not necessarily in the presented order:

(A) bringing/setting, by a control unit, an alternating current (AC) storage device into a first operation mode,
(B) charging the AC storage device by transferring energy stored in the battery to the AC storage device;
(C) determining, by the control unit, whether a charging level of the AC storage device corresponds to a defined upper threshold,
(D) bringing/setting, by the control unit, the AC storage device into a second operation mode, when the charging level of the AC storage device is determined to correspond to the defined upper threshold,
(E) discharging the AC storage device by transferring energy stored in the AC storage device to the battery,
(F) determining, by the control unit, whether a charging level of the AC storage device corresponds to a defined lower threshold,
(G) bringing/setting, by the control unit, the AC storage device into the first operation mode, when the charging level of the AC storage device is determined to correspond to the defined lower threshold, and
(H) repeating (B) to (G) until the battery is at a defined operation temperature. Thereby, the energy being transferred back and forth between the battery and the AC storage device, particularly during (B) to (G), corresponds to reactive power occurring in the AC storage device due to transferring energy from the battery to the AC storage device.

The method may be at least partly computer-implemented, and may be implemented in software and/or in hardware. Further, the method may be carried out by computer program instructions running on means that provide data processing functions. The data processing means may be a suitable computing means, such as an electronic control module etc. The method allows quickly heating the battery to a defined temperature by producing heat inside the battery instead of transferring heat being created outside the battery into the battery. For this purpose, the method uses the fact that a battery is not 100% efficient due to losses occurring during transferring energy into and out of the battery. Those losses, particularly the losses inside the battery heats the battery. Additionally, the method allows reducing and/or eliminating the need of external heaters and/or another external power supply, thereby achieving an improved overall energy efficiency of the battery heating.

The method allows producing losses inside the battery that reduces and/or eliminates the need to transport heat, e.g. by using the thermal cooling circuit, into the battery. Therefore, less energy is needed to achieve the same amount of heating in the battery compared to methods transferring externally produced heat into the battery, resulting in an increased overall efficiency of the battery heating process.

In other words, the method deliberately uses the "undesired" effects of an operation of a battery in a cold state, namely that an efficiency of a cold battery is typically low, resulting in high losses during operation of the battery in that state. The losses, which are created inside the battery, heat the battery until the defined operation temperature is achieved. Thereby, during performing the method or during heating the battery, respectively, the efficiency of the battery is temporarily reduced until the defined operation temperature is achieved and the method for heating the battery is terminated.

The defined operation temperature may be defined as a lower threshold and/or a temperature range. The AC storage device is to be understood as an electric or electronic component that is capable of storing a defined amount of energy, when energy is transferred through the component and/or when the transferred energy corresponds to alternating current. In other words, the AC storage device may be an electronic component which, in case energy is transferred through the electric component, stores part of this transferred energy at least for a short-term time period. The stored energy may be referred to as reactive power.

By means of controlling the AC storage device, by the control unit, it is possible to control a direction of energy transfer, either from the battery to the AC storage device or vice versa.

According to an embodiment, the AC storage device may be configured to store the transferred energy in an electromagnetic field or in an electrostatic field.

Electrostatic fields arise from a potential difference or a voltage gradient, whereas electromagnetic fields arise from a flow of current. It should be noted that the electromagnetic field is only present as long as energy may be supplied to the AC storage device, e.g. as long as energy may be transferred back and forth between the AC storage device and another component, e.g. the battery.

According to an embodiment, the AC storage device may be an electric machine comprising a plurality of windings having a defined inductance.

The electric machine may be configured to be a propulsion motor for the vehicle and the plurality of windings serves as the AC storage device by creating an electromagnetic field when energy is transferred from the battery to the electric machine, thereby storing a part of the transferred energy in the electromagnetic field. Thus, the AC storage device may be incorporated into the electric machine and therefore, no additional components for providing the AC storage device may be needed.

According to an embodiment, a power electronic converter may be arranged between the battery and the electric machine.

The power electronic converter may correspond to an inverter already incorporated in a circuit of the vehicle, which may be typically used to connect the battery and the electric machine in a vehicle. Thus, no additional power electronic converter may be needed for implementing the method for heating the battery.

According to an embodiment, each transfer of energy may cause losses inside the battery and/or the power electronic converter and/or the AC storage device.

These losses may mainly result from the resistance of the respective current carrying component, namely the battery, the power electronic converter and the AC storage device. Thus, an inevitable, usually unwanted phenomenal may be used on purpose to create heat inside the respective current carrying component.

According to an embodiment, the losses may heat the battery and/or the power electronic converter and/or the AC storage device.

In particular, by heating the battery by means of the losses created inside the battery, the battery may be heated from the inside and there may be no more need for transferring external heat into the battery first to heat the battery. Therefore, using the losses to heat, particularly the battery from the inside, may be more efficient as less energy may be needed to achieve the same amount of heating in the battery compared to hating the battery with external heat.

According to an embodiment, wherein the losses may be defined by the following formula: losses (P)=resistance (R)*current$^2$ (I$^2$).

The losses may mainly result from the resistance of the respective current carrying component, and may be referred to as resistive losses. The resistive losses are defined by the product of the resistance of the respective current carrying component and the square current, a small increase of the current amplitude will make a large contribution to these losses.

According to an embodiment, wherein (B) to (G) may be repeated between one time per second to several thousand times per second, preferably between ten times per second to 2000 times per second, more preferably between 100 times per second to 500 times per second.

The number of repetitions per second may influence the amount of heat being created in the battery per cycle. The number of repetitions may be selected dependent on, e.g. a size of the AC storage device and/or operating conditions of the battery, such as temperature and/or age and/or average voltage and/or charging rates and/or state of charge, etc. For example, for transferring a defined amount of energy in a defined range of time, the number of repetitions per second (also known as frequency) needs to be higher for an AC storage device being capable of storing only a small amount of energy than for an AC storage device capable of storing a large amount of energy. As another example, the internal resistance of the battery may differ dependent on the frequency. Preferably, the number of repetitions per second may be selected in order to achieve the highest resistance in the battery.

According to an embodiment, the first operation mode of the electric machine may be configured to magnetize the plurality of windings at least partly and the second operation mode of the electric machine may be configured to de-magnetize the plurality of windings at least partly.

The windings of the electric machine may be magnetized when energy is transferred from the battery to the electric machine, thereby creating an electromagnetic field storing energy corresponding to the reactive power. Further, the windings of the electric machine may be de-magnetized when energy is transferred from the electric machine to the battery, thereby diminishing the electromagnetic field. In other words, while cycling energy back and forth between the battery and the electric machine, the reactive power may be oscillating between the battery and the electric machine.

According to an embodiment, the power electronic converter may be an inverter comprising a direct current (DC)-link capacitor and at least one power switch.

The DC-link capacitor may usually serve as an in-filter to remove stress on the battery during an operation state. In this method, the DC-link capacitor may further work as an electrostatic storing device storing the reactive power in an electric field.

According to an embodiment, the DC-link capacitor may have a defined terminal voltage and/or may be connected in parallel to the battery.

The parallel connection between the battery and the capacitor may cause that the battery may recharge the DC-link capacitor to its defined terminal voltage when the terminal voltage of the capacitor may be decreased due to energy transfer from the battery, via the capacitor, to the AC storage device. In case, the AC storage device is the electric machine, the reactive power is oscillating between the capacitor and the electric machine.

According to a second aspect, there is provided a control unit of a vehicle for controlling the heating of a battery in the vehicle, particularly a battery electric vehicle (BEV), a hybrid electric vehicle (HEV) or a plugin hybrid electric vehicle (PHEV). The control unit is configured to perform a method for heating of a battery according to the first aspect.

According to a third aspect, there is provided a vehicle, particularly a battery electric vehicle (BEV), a hybrid electric vehicle (HEV) or a plugin hybrid electric vehicle (PHEV). The vehicle comprises a battery, a power electronic converter, an alternating current (AC) storage device being configured to store energy for a short-term period, and a control unit, preferably according to the second aspect. The battery and the AC storage device are connected via the power electronic converter. The control unit is configured to control the AC storage device and to perform a method for heating the battery according to the first aspect.

By heating the battery according to the method of the first aspect, the overall efficiency of the battery is improved, which may increase the range of the vehicle between two charging cycles. Additionally, the method may also be performed during propulsion of the vehicle.

According to the embodiment, the AC storage device may be an electric machine comprising a plurality of windings having a defined inductance.

According to an embodiment, the electric machine may correspond to a propulsion motor of the vehicle and/or the battery may correspond to a traction battery of the vehicle.

The plurality of windings of the electric machine serves as the AC storage device by creating an electromagnetic field when energy is transferred from the battery to the electric machine, thereby storing a part of the transferred energy in the electromagnetic field. Thus, the AC storage device may be incorporated into the electric machine and therefore, no additional components for providing the AC storage device may be needed. The battery may be heated from inside the battery, thus no additional, particularly no external, heating elements may be needed to heat the battery.

In other words, the battery being the traction battery may be heated only by using components of the vehicle which may be already included in the vehicle, e.g. the propulsion motor, etc., and without the need of any additional components.

According to an embodiment, the power electronic converter may be an inverter.

The inverter may correspond to an inverter already incorporated in a circuit of the vehicle, which may be typically used to connect the battery and the electric machine in a vehicle. Thus, no additional power electronic converter may be needed for implementing the method for heating the battery.

It should be noted that the above embodiments may be combined with each other irrespective of the aspect involved. Accordingly, the method may be combined with structural features and, likewise, the vehicle may be combined with features described above with regard to the method.

These and other aspects of the present invention will become apparent from and elucidated with reference to the embodiments described hereinafter.

BRIEF DESCRIPTION OF DRAWINGS

Exemplary embodiments of the invention will be described in the following with reference to the following drawings.

The figures are merely schematic representations and serve only to illustrate embodiments of the invention. Identical or equivalent elements are in principle provided with the same reference signs.

DESCRIPTION OF EMBODIMENTS

Figure 1:
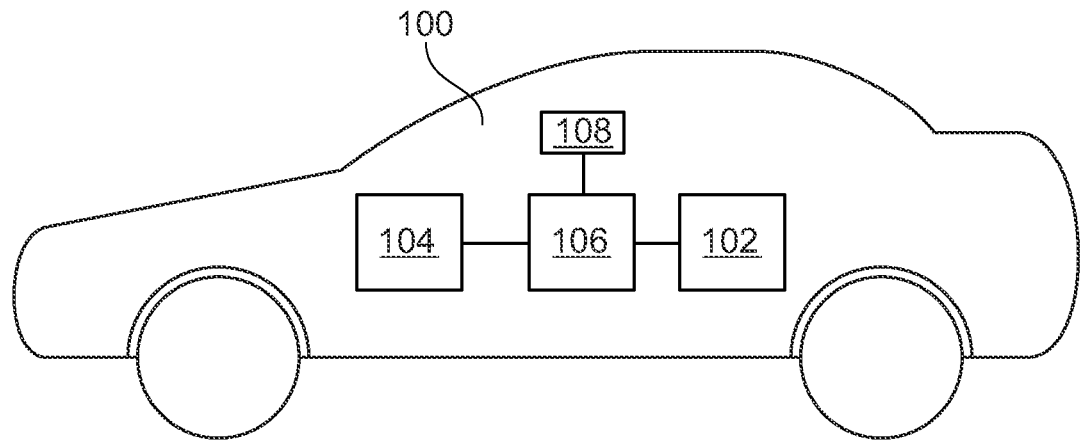
FIG. 1 shows a schematic view of an exemplary embodiment of a vehicle.

FIG. 1 shows an embodiment of a vehicle 100 in a schematic illustration. In this embodiment, the vehicle 100 may be a battery electric vehicle (BEV) 100 and comprises a battery 102, and an electric machine 104. Alternatively, the vehicle 100 may be also a hybrid electric vehicle (HEV) or a plugin hybrid electric vehicle (PHEV).

In this embodiment, the electric machine 104 may be a propulsion motor of the vehicle 100 and the battery 102 may be a traction battery of the vehicle 100. The battery 102 corresponds to an electrochemical energy storage device capable of storing energy for a long-term period. Further, the battery 102 is configured to provide energy to the electric machine 104 for propelling or driving the vehicle 100. The electric machine 104 as the propulsion motor is configured to convert the energy provided by the battery into mechanical power for driving the vehicle 100.

The battery 102 is connected to the electric machine 104 via a power electronic converter 106. The power electronic converter 106 converts a direct current (DC) provided by the battery 102 into alternating current (AC) required by the electric machine 104 and vice versa.

Further, the vehicle 100 comprises a control unit 108, which is configured to control the electric machine 104 in terms of an operation state of the electric machine 104. In a first operation state, the electric machine 104 is provided with energy, e.g., from the battery 102. In a second operation state, the electric machine 104 is providing energy to any electric or electronic component connected with the electric machine 104, e.g. the battery 102. For this purpose, the control unit 108 may actually control the power electronic converter 106 that, in turn, may influence the electric machine 104 in terms of the operation state. In other words, the control unit 108 is configured to switch the electric machine 104 between the first operation state in which the electric machine 104 may be at least partly charged or loaded with energy, and the second operation state in which the electric machine 104 may be at least partly discharged, by controlling the power electronic converter 106 accordingly. The control unit 108 may be a separate control unit only for controlling the electric machine 104 or may be integrated into a vehicle control unit (not illustrated) configured to control various functions and/or components of the vehicle 100. In the first case, the control unit 108 further may be integrated into the power electronic converter 106. It should be noted that the order of the battery 102, the electric machine 104, the power electronic converter 106 and the control unit 108 as shown in FIG. 1 is only schematic and exemplary and may be different in practice.

Figure 2:
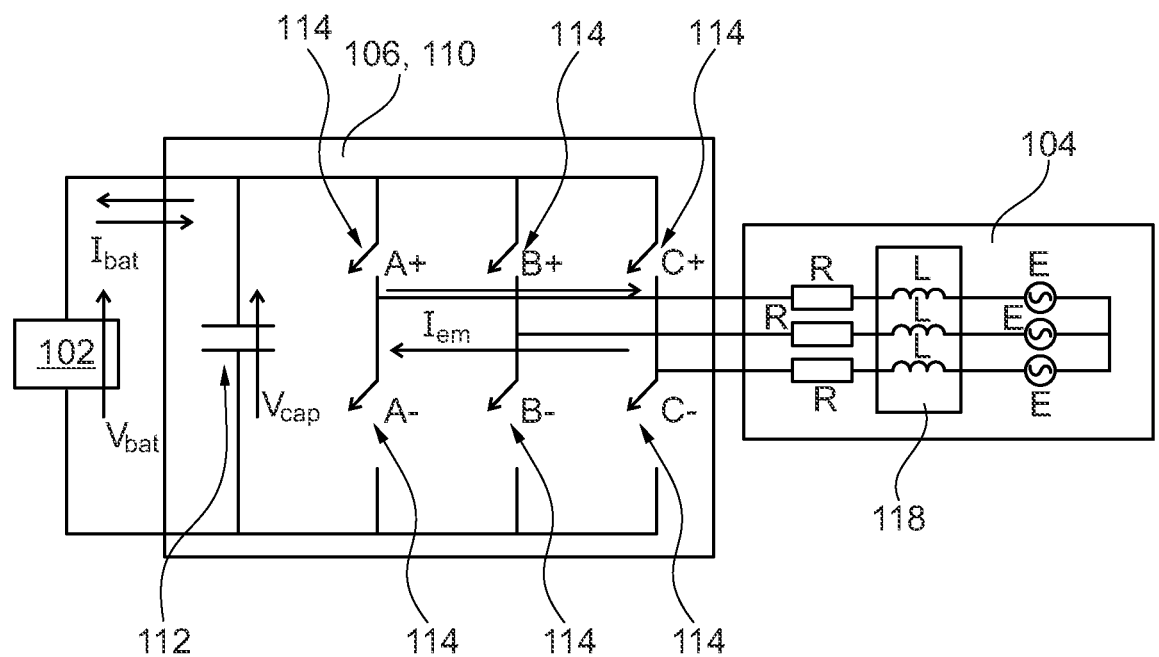
FIG. 2 shows a functional chart of a circuit between a battery and an electric machine for heating the battery according to an embodiment.

FIG. 2 shows an embodiment of a power circuit between the battery 102 and the electric machine 104. In this embodiment, the electric machine 104 is configured as a three-phase system. The power electronic converter 106 is an inverter 110 and comprises a capacitor 112 and six power switches 114, two for each phase of the electric machine 104. The inverter 110 as shown in FIG. 2 is only exemplary and the inverter 110 may be any other type of inverter.

Each phase of the electric machine 104 comprises a resistance R, such as a resistive component, an inductive part having an inductance L and an induced AC voltage source E. The inductance L is provided by a plurality of windings creating an electromagnetic field when energy is transferred through the windings.

The capacitor 110 may work as an in-filter configured to remove stress on the battery 102 during normal operation, e.g. during propulsion of the vehicle 100 and/or during a charging process.

Figure 3:
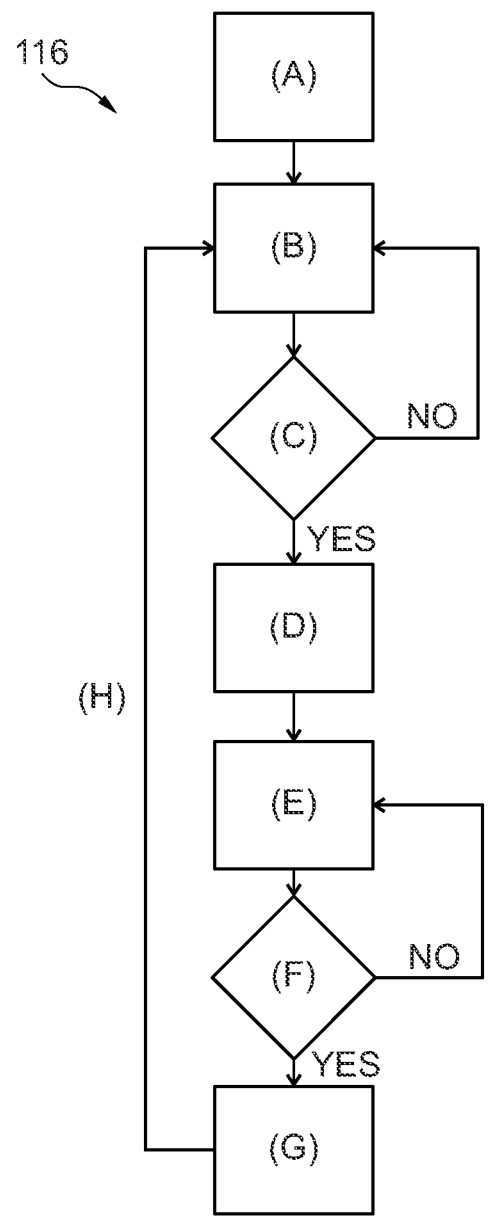
FIG. 3 shows a flowchart, schematically illustrating an exemplary embodiment of a method for heating a battery in a vehicle.

FIG. 3 shows an embodiment of a method 116 for heating the battery 102 in the vehicle 100 as a flowchart. The method 116 comprises the following, which do not have to be carried out necessarily in the presented order:

In (A), the control unit 108 switches an AC storage device 118 into the first operation mode. The AC storage device 118 is configured to store a defined amount of energy in an electromagnetic or an electrostatic field. With regard to FIG. 2, the electric machine 104 comprising the plurality of windings may correspond to the AC storage device 118 storing the energy in an electromagnetic field. In (B), energy stored in the battery 102 is transferred to the AC storage device 118, thereby charging the AC storage device 118. With regard to FIG. 2, charging the AC storage device 118 means that due to the transferred energy, the windings of the electric machine 104 create an electromagnetic field in which part of the transferred energy is temporarily stored.

In (C), the control unit 108 determines whether a charging level of the AC storage device 118 corresponds to a defined upper threshold or exceeds the defined threshold. With regard to FIG. 2, the charging level of the AC storage device 118 corresponds to the inductance L of the windings of the electric machine 104. In case, the charging level does not correspond to the defined upper threshold, that means the charging level has not yet reached the defined upper threshold, (NO in FIG. 3), the method 116 continues charging the AC storage device 118 by transferring energy stored in the battery 102 to the AC storage device 118. In case, the charging level corresponds to the defined upper threshold or has exceeded the defined upper threshold (YES in FIG. 3), the control unit 108 switches the AC storage device 118 into the second operation mode (in (D)). The defined upper threshold may depend on external conditions under which the method may be performed, e.g., method is performed during propulsion of the vehicle etc.

In (E), energy stored in the AC storage device 118 is transferred to the battery 102, potentially via the power electronic converter 106, by discharging the AC storage device 118. With regard to the embodiment of FIG. 2, the electric machine 104 transfers energy to the battery 102, wherein the windings of the electric machine 104 are being de-magnetized resulting in a diminishing electromagnetic field. In (F), the control unit 108 determines whether a charging level of the AC storage device 118 corresponds to a defined lower threshold. With regard to FIG. 2, the charging level of the AC storage device 118 corresponds to the inductance L of the windings of the electric machine 104. In case, the charging level does not correspond to the defined lower threshold, that means the charging level has not yet reached the defined lower threshold, (NO in FIG. 3), the method 116 continues discharging the AC storage device 118 by transferring energy form the AC storage device 118 to the battery 102. In case, the charging level corresponds to the defined lower threshold or has fallen below the defined lower threshold (YES in FIG. 3), the control unit 108 switches the AC storage device 118 into the first operation mode (in (G)). The defined lower threshold may depend on external conditions under which the method may be performed, e.g., method is performed during propulsion of the vehicle etc. Further, the defined lower threshold may be zero. In (H), (B) to (G) are repeated until the battery 102 has reached a defined operation temperature.

The energy being transferred back and forth between the battery 102 and the AC storage device 118 corresponds to reactive power which occurs in the AC storage device 118 due to transferring energy from the battery 102 to the AC storage device 118.

The repeatedly performed energy transfer between the battery 102 and the AC storage device 118 is lossy, wherein the main losses results from the resistance inside the current carrying components, such as the battery 102, the AC storage device 118 etc. These resistive losses generate heat inside the current carrying component, which are particularly used inside the battery 102 to heat the battery 102. Since the resistive losses are defined by the following formula: resistive losses $(P) = \text{resistor } (R) * \text{current}^2 (I^2)$, even a small increase in the current amplitude will make a large contribution to the losses.

The following will describe the method 116 in connection with the embodiment of the circuit according to the embodiment shown in FIG. 2.

By means of the control unit 108, the electric machine 104 is controlled to either receive energy from the battery 102 (first operation mode) or transfer energy to the battery 102 (second operation mode) via the inverter 110. As mentioned earlier, the inverter 110 comprises the capacitor 112 and six power switches 114. The capacitor 112 works as an energy storage device. In general, the amount of energy that can be stored by the capacitor 112, depends on its terminal voltage $V_{cap}$. The inductance L of the electric machine 104 resulting from the plurality of winding of the electric machine 104 defines the capacity of the AC storage device 118, wherein the windings and the electric machine 104 respectively corresponds to the AC storage device 118. In the first operation mode, the electric machine 104 is receiving energy from the capacitor 112 having a defined terminal voltage $V_{cap}$. This reduces the total energy stored in the capacitor 112 resulting in a drop of the terminal voltage $V_{cap}$. Since the battery 102 and the capacitor 112 of the inverter 110 are connected in parallel, the battery 102 may maintain a defined terminal voltage $V_{cap}$ of the capacitor by providing the capacitor 112 with energy to restore the defined terminal voltage $V_{cap}$.

A charge rate between the battery 102 and the capacitor 112 is only limited by the impedance of the component connecting the battery 102 and the capacitor 112, e.g. a cable. Preferably, the impedance is low, ideally close to zero, since then the energy being transferred to the electric machine 104 comes directly from the battery 102.

In the second operation mode, the electric machine 104 transfers the energy stored in the electromagnetic field of the windings back to the battery 102, and potentially to the capacitor 112, in case the capacitor 112 does not have the same voltage as the battery 102.

In other words, the plurality of windings of the electric machine 104 allows storing energy in an electromagnetic field without producing any mechanical power. The energy stored in the windings initially comes from the battery 102 and by means of the control unit 108 controlling the electric machine 104, this energy can be returned to the battery 102. Thus, the control unit 108 allows controlling of the electric machine 104 such that, energy may be transferred back and forth between the battery 102 and the electric machine 104. This energy (or power) cycling is not 100% efficient due to inevitable resistances in the circuit. Thus, there will be losses in all nodes included to the cycling circuit and these losses, particularly the losses occurring inside the battery, are used specifically to heat the battery from inside. Thus, the method is based on specifically exploiting the low efficiency of a cold battery to heat the battery, because the lower the efficiency the higher the resulting losses during operation.

Furthermore, the method 116 for heating the battery 102 has an improved overall efficiency for the battery heating process, because the losses are created inside the battery. Thus, there is no need to transport external heat into the battery resulting in achieving a defined temperature of the battery with a reduced amount of energy.

The implementation of the method 116 into the circuit as shown in FIG. 2 may be particularly advantageous, because no additional components in the vehicle may be needed to perform the method, when the electric machine 104 may be used as the AC storage device 118. It should be noted that the capacitor 112 is not obligatory to perform the method 116.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS 100 vehicle
102 battery
104 electric machine
106 power electronic converter
108 control unit
110 inverter
112 capacitor
114 power switch
116 method
118 AC storage device
R resistor
L inductance
E AC voltage source

The invention claimed is:

1. A method for heating a battery in a vehicle, comprising:
   (A) setting, by a control unit, an alternating current (AC) storage device to a first operation mode;
   (B) charging the AC storage device by transferring energy stored in a battery to the AC storage device;
   (C) determining, by the control unit, whether a charging level of the AC storage device corresponds to a defined upper threshold;
   (D) setting, by the control unit, the AC storage device to a second operation mode, when the charging level of the AC storage device is determined to correspond to the defined upper threshold;
   (E) discharging the AC storage device by transferring energy stored in the AC storage device to the battery;
   (F) determining, by the control unit, whether a charging level of the AC storage device corresponds to a defined lower threshold;
   (G) setting, by the control unit, the AC storage device to the first operation mode, when the charging level of the AC storage device is determined to correspond to the defined lower threshold; and
   (H) repeating (B) to (G) until the battery is at a defined operation temperature,
   wherein the energy being transferred back and forth between the battery and the AC storage device corresponds to reactive power occurring in the AC storage device due to transferring energy from the battery to the AC storage device.

2. The method of claim 1, wherein the AC storage device is configured to store the transferred energy in an electromagnetic field or in an electrostatic field.

3. The method of claim 1, wherein the AC storage device is an electric machine comprising a plurality of windings having a defined inductance (L).

4. The method of claim 3, wherein a power electronic converter is arranged between the battery and the electric machine.

5. The method of claim 4, wherein each transfer of energy causes losses inside the battery, the power electronic converter or the AC storage device.

6. The method of claim 5, wherein the losses heat the battery, the power electronic converter or the AC storage device.

7. The method of claim 5, wherein the losses are defined by the following formula:

$$losses(P) = resistance(R) * current^2(I^2).$$

8. The method of claim 1, wherein (B) to (G) are repeated between one time per second to several thousand times per second, preferably between ten times per second to 2000 times per second, more preferably between 100 times per second to 500 times per second.

9. The method of claim 3, wherein the first operation mode of the electric machine is configured to magnetize the plurality of windings at least partly and the second operation mode of the electric machine is configured to de-magnetize the plurality of windings at least partly.

10. The method of claim 4, wherein the power electronic converter is an inverter comprising a direct current (DC)-link capacitor an at least one power switch.

11. The method of claim 10, wherein the DC-link capacitor has a defined terminal voltage ($V_{cap}$) or is connected in parallel to the battery.

12. A control unit of a vehicle for controlling the heating of a battery in a vehicle, the control unit being configured to perform a method of heating the battery, the method comprising:
   (A) setting, by a control unit, an alternating current (AC) storage device to a first operation mode;
   (B) charging the AC storage device by transferring energy stored in a battery to the AC storage device;
   (C) determining, by the control unit, whether a charging level of the AC storage device corresponds to a defined upper threshold;
   (D) setting, by the control unit, the AC storage device to a second operation mode, when the charging level of the AC storage device is determined to correspond to the defined upper threshold;
   (E) discharging the AC storage device by transferring energy stored in the AC storage device to the battery;
   (F) determining, by the control unit, whether a charging level of the AC storage device corresponds to a defined lower threshold;
   (G) setting, by the control unit, the AC storage device to the first operation mode, when the charging level of the AC storage device is determined to correspond to the defined lower threshold; and
   (H) repeating (B) to (G) until the battery is at a defined operation temperature, wherein the energy being transferred back and forth between the battery and the AC storage device corresponds to reactive power occurring in the AC storage device due to transferring energy from the battery to the AC storage device.

13. A vehicle, comprising:
a battery;
a power electronic converter;
an alternating current (AC) storage device; and
a control unit, wherein the battery and the AC storage device are connected via the power electronic converter, and the control unit is configured to control the AC storage device, and to perform a method for heating the battery, wherein the method comprises:
(A) setting, by a control unit, an alternating current (AC) storage device to a first operation mode;
(B) charging the AC storage device by transferring energy stored in a battery to the AC storage device;
(C) determining, by the control unit, whether a charging level of the AC storage device corresponds to a defined upper threshold;
(D) setting, by the control unit, the AC storage device to a second operation mode, when the charging level of the AC storage device is determined to correspond to the defined upper threshold;
(E) discharging the AC storage device by transferring energy stored in the AC storage device to the battery;
(F) determining, by the control unit, whether a charging level of the AC storage device corresponds to a defined lower threshold;
(G) setting, by the control unit, the AC storage device to the first operation mode, when the charging level of the AC storage device is determined to correspond to the defined lower threshold; and
(H) repeating (B) to (G) until the battery is at a defined operation temperature, wherein the energy being transferred back and forth between the battery and the AC storage device corresponds to reactive power occurring in the AC storage device due to transferring energy from the battery to the AC storage device.

14. The vehicle of claim 13, wherein the AC storage device is an electric machine comprising a plurality of windings having a defined inductance (L).

15. The vehicle of claim 14, wherein the electric machine corresponds to a propulsion motor of the vehicle or the battery corresponds to a traction battery of the vehicle.

* * * * *